April 15, 1969     C. C. JOHNSTON     3,438,834
CUTTING AND HEAT SEALING THERMOPLASTIC FILM
Filed March 31, 1966
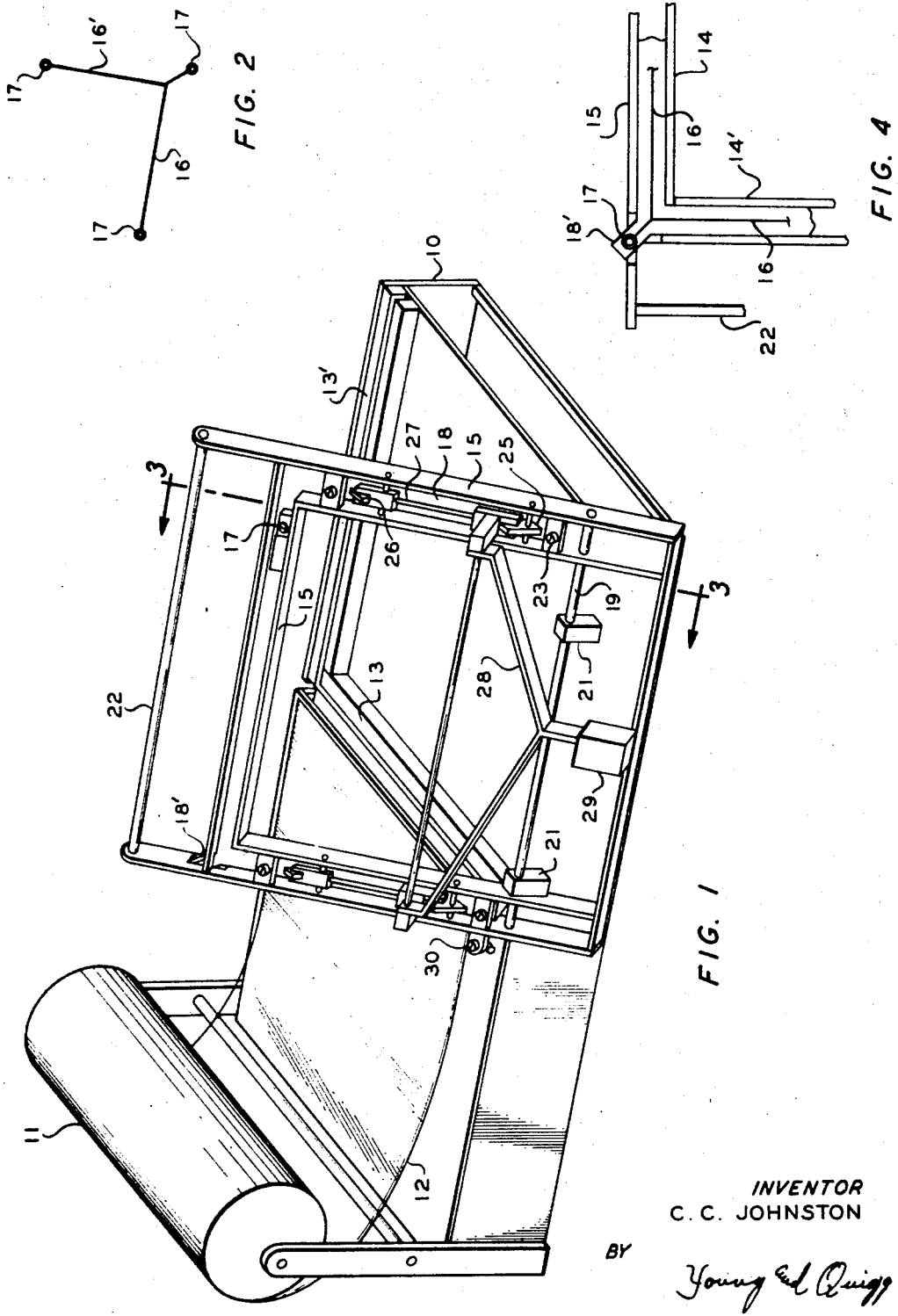
INVENTOR
C. C. JOHNSTON
BY
ATTORNEYS

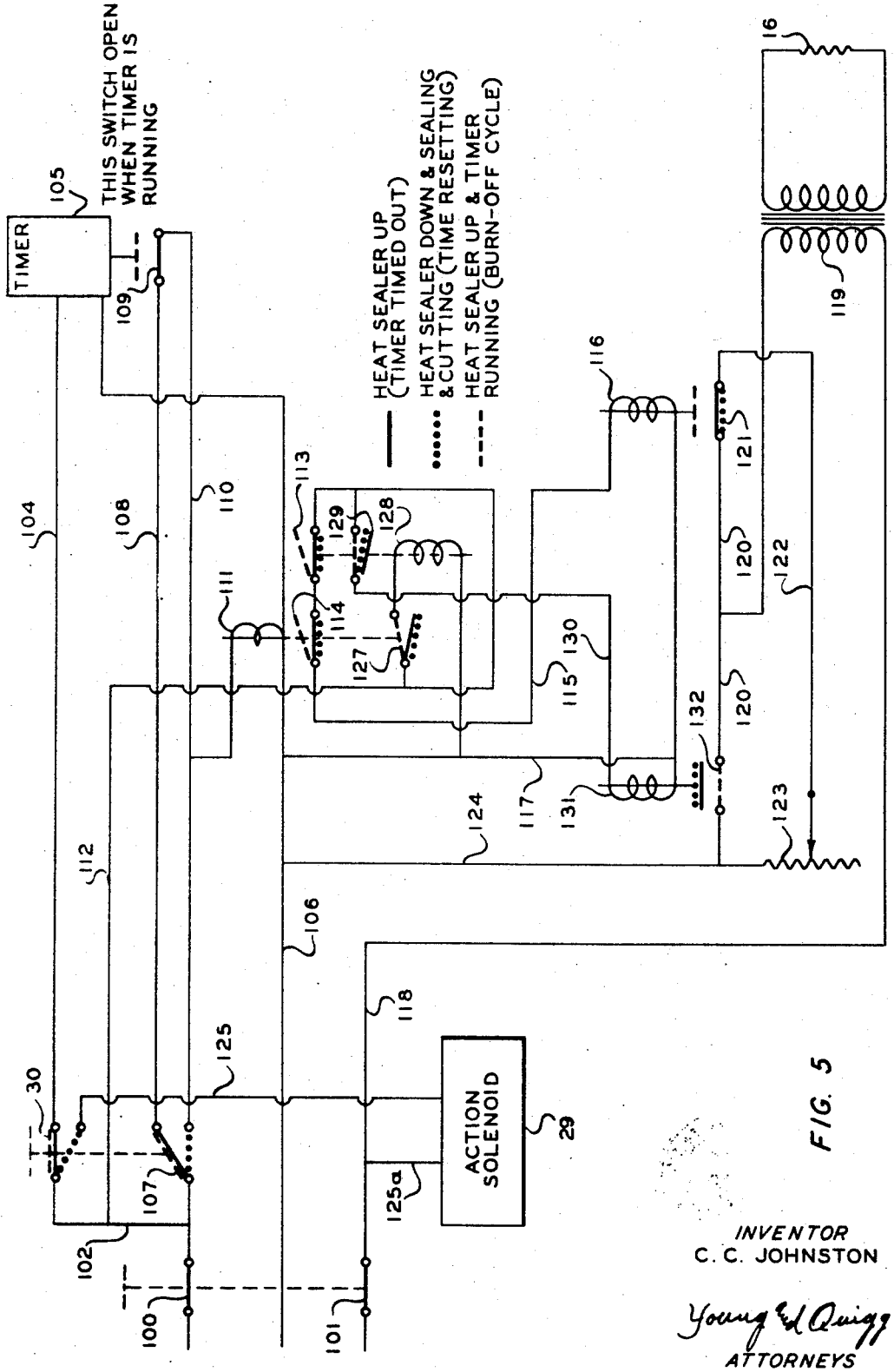

United States Patent Office 3,438,834
Patented Apr. 15, 1969

3,438,834
CUTTING AND HEAT SEALING THERMOPLASTIC FILM
Chester C. Johnston, Dewey, Okla., assignor to Phillips Petroleum Company, a corporation of Delaware
Filed Mar. 31, 1966, Ser. No. 539,080
Int. Cl. B32b 31/18, 31/26
U.S. Cl. 156—515            4 Claims

ABSTRACT OF THE DISCLOSURE

In an apparatus for making and sealing thermoplastic bags, a plurality of cams are operatively connected to a pivotally mounted press frame which contains longitudinally grooved bars; a wire supported on a wire support frame, operatively connected to said cams, is positioned in the grooves of said bars, said wire is maintained at a constant temperature by a first electrical circuit; and a second electrical circuit is operatively connected to said cams and contains a switch that is closed when said press frame is pressed upon layers of thermoplastic whereby said wire support frame is moved by said cams to cause the wire to move out of said grooves in said press frame, through said thermoplastic layers, and into grooves in a work table cutting said layers and sealing them together.

---

This invention relates to a method and means for cutting and heat sealing thermoplastic film including both oriented and unoriented film. In one aspect this invention relates to a method and means for cutting and heat sealing thermoplastic film in the operation of packaging articles by wrapping such articles with thermoplastic film and heat sealing the film which forms the wrapping.

It is an object of the invention to provide a method for cutting and heat sealing a plurality of layers of thermoplastic film so that a positive and strong seal is obtained with both oriented and unoriented thermoplastic film. It is also an object of this invention to provide a method and means for packaging articles in an envelope of thermoplastic film so that a strong seal is obtained at the sealed edges of the envelope with either oriented or unoriented plastic film without modification of the procedure or the device when changing from one type of film to another. Still another object of the invention is to provide a method and means for gripping the layers of film to be severed and sealed in a manner so that a strong seal results regardless of the orientation characteristics of the film. Still another object of this invention is to provide a method and means for mechanically passing the sealing wire through the layers of film when the handle of the apparatus is depressed so that positive and uniform cutting and sealing will be accomplished in each cycle. Other and further objects of the invention will be apparent to those skilled in the art upon reading the disclosure including the detailed description of the invention and the drawing wherein:

FIGURE 1 is a perspective view of the apparatus of the invention;

FIGURE 2 is a view of the wire which does the cutting and sealing;

FIGURE 4 shows the area where the junction of the heating wires extends beyond the frame; and FIGURE 5 shows an electrical circuit which can be used in the device of FIGURE 1.

Figure 3:
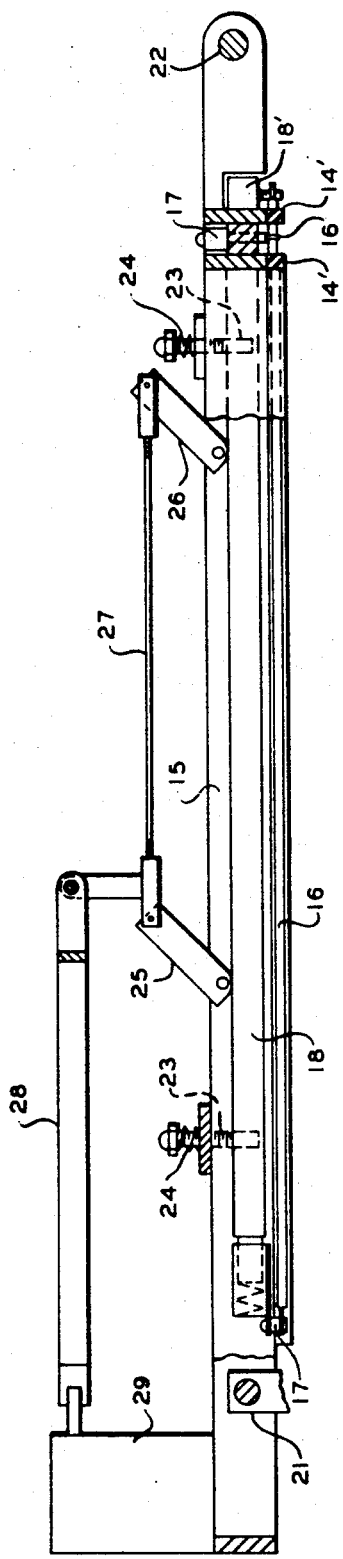
FIGURE 3 is a view along line 3—3 of FIGURE 1.

I have discovered that a thermoplastic film cutting and sealing device can be operated more efficiently and satisfactorily by causing the heated wire or ribbon to pass through the thermoplastic films by a mechanical action rather than manual action. This is accomplished by means of a solenoid actuating a plurality of cams attached to the frame carrying the heated wire. The solenoid is actuated by a switch which is closed when the operating handle of the clamping frame is lowered to a position such that the layers of film are firmly gripped between the resilient pressure bars as hereinafter more fully described. Regardless of how slowly or how rapidly the operating handle is moved the heated wire passes through the layers of film at a uniform rate. Prior to my invention operation of a cutting and sealing device by different persons often necessitated temperature or spring tension changes in order to provide satisfactory seals because different operators often cause the heated wire to pass through the layers of film at different rates so that nonuniform and sometimes unsatisfactory seals resulted. The operation of the device in accordance with the practice of my invention is described in greater detail in the following detailed description of the figures of the drawing.

Referring to FIGURE 1 of the drawing, a bag sealer is shown comprising a work base 10 having a roll 11 of folded plastic film mounted thereon with the fold 12 at the near side. A pair of grooved pressure bars 13 and 13' are positioned on the work table and opposed grooved pressure bars 14 and 14', shown in FIGURE 4, are mounted on press frame indicated at 15. The opposed pressure bars serve to grip and hold the plastic film and the grooves provide a space for a hot ribbon or wire 16, shown in FIGURE 2, to pass through the film, simultaneously cutting and sealing the edges of the bag. The hot wire 16 is carried by insulating posts 17, shown in FIGURES 2 and 3, on rectangular frame 18. A projection 18' supports the hot wire 16 at the angle where 16 and 16' are joined together as shown in FIGURE 2.

As indicated in FIGURE 3, the press frame 15 is pivotally secured to work table 10 by means of shaft 19 supported on work table 10 by blocks 21. Frame 18 which carries the hot wire 16 is supported on press frame 15 by means of bolts 23 which are spring biased by springs 24 to maintain the hot wire 16 within the groove of grooved pressure bars 14 and 14'. Cam members 25 and 26 are pivotally secured to press frame 15 and to shaft 27 which is actuated through linkage 28 to solenoid 29 so that when solenoid 29 is actuated the cam members 25 and 26 are moved to vertical position, thus forcing hot wire 16 from the groove of pressure bars 14 and 14' toward the grooves of pressure bars 13 and 13' sufficiently to cut and seal the layers of plastic film.

Solenoid 29 is actuated by switch 30 when press frame 15 is operated by handle 22 to closed position.

The operation of the heating cycle is shown in the electrical circuit of FIGURE 5. Switches 100 and 101 are operated simultaneously and when closed current flows through switch 100, line 102, switch 30, line 104, timer 105 and to ground line 106. Current also flows through switch 107, line 108, switch 109, line 110 and coil 111 to ground 106. Current also flows through line 112, switches 113 and 114, line 115, coil 116 and line 117 to ground 106. Current also flows through switch 101, line 118, heater coil 119, line 120, switch 121, line 122, variable resistance 123 and line 124 to ground 106.

When switches 100 and 101 are closed the heater coil 119 is operated to maintain the heater ribbon at cutting and sealing temperature and timer 105 is run out. The sealer handle is in up position.

When the sealer handle is depressed switches 30 and 107 are operated so that timer 105 is reset and current flows through switch 30 and lines 125 and 125a actuating solenoid 29 which lowers the heater ribbon through the layers of plastic film, cutting and sealing them. Current flows through switch 107, line 110 and coil 111 to ground 106. Current also continues to flow through lines 102 and 112, switches 113 and 114, line 115, coil 116, and line 117 to ground 106. Current also continues to flow through line 118, heater coil 119, line 120, switch 121, line 122, resistance 123, and line 124 to ground 106.

When the sealer handle is raised the timer 105 is actuated. Current flows through switch 30, line 104 and timer 105 to ground 106; however the timer 105 holds switch 109 open for the duration of the time period. With no current flowing through coil 111, switch 114 is opened and switch 127 is closed so that current flows via line 112 through coil 128 and line 117 to ground 106. Current also flows through switch 129, line 130, coil 131 and line 117 to ground 106. Current now flows through line 118, coil 119, line 120, switch 132 and line 124 to ground 106. This condition obtains for the duration of the running of timer 105. When timer 105 runs out switch 109 closes, switches 113, 114 and 116 close; switches 127, 129 and 132 open and the system is ready for the next cycle.

A film cutting and sealing device substantially as shown in the drawing has been operated successfully in cutting and sealing oriented and unoriented polyethylene films of various thickness. A Guardian Number 18–78 continuous duty 230 vacuum coil solenoid obtained from Guardian Electric Manufacturing Company of Chicago, Ill., was used to pass the heated wire through the films to be cut and sealed. If it is desired that the hot wire return to the groove of the press frame bar immediately after passing through the layers of film, a timer can be included in the solenoid circuit to open the circuit after a designated time, e.g. 1 or 2 seconds. Also if it is desired that the wire pass through the layers of film at a rate slower than that of the normal action of the solenoid, a damping device such as a pneumatic or hydraulic surge pot can be included in the solenoid-to-cams linkage.

High density polyethylene film, e.g. 0.950 to 0.960 gm./cc. has been successfully cut and sealed according to the practice of this invention over a range of about 0.5 to 10 mils in thickness. Such thermoplastic materials up to a thickness of about 20 mils can be cut and sealed satisfactorily.

The temperature of the cutting and sealing wire or ribbon will ordinarily be maintained at about 400 to 600° F. Temperatures outside this range can, of course, be utilized if desired.

That which is claimed is:

1. In apparatus for making and sealing thermoplastic bags wherein a pivotally mounted press frame is pressed upon a folded strip of thermoplastic material disposed upon a work table so as to grip the unsealed layers of thermoplastic between opposing longitudinally grooved bars positioned on said press frame and said work table respectively, the combination therewith of;

a plurality of cams operatively connected to said press frame;

a wire support frame operatively connected to said cams;

a wire supported on said wire support frame so as to be positioned in the grooves of the bars on said press frame;

a first electrical circuit including said wire adapted to apply sufficient electrical energy to said wire to maintain said wire at a substantially constant temperature;

a second electrical circuit including electrical means operatively connected to said cams; and a switch in said second electrical circuit that is closed when said press frame is pressed upon said folded strip of thermoplastic material and said work table whereby said wire support frame is moved by said cams to cause the wire to move out of the grooves in said press frame, through the layers of thermoplastic material and into the grooves of the work table cutting said layers and sealing them together.

2. The apparatus of claim 1 wherein the means in the second electrical circuit operatively connected to said cams is a solenoid.

3. The apparatus of claim 1 wherein the wire support frame is spring biased to said press frame so as to urge the wire into the groove of the bar of said press frame.

4. The apparatus of claim 1 wherein the cams are substantially rectangular blocks, pivotally secured to said press frame and operatively connected to said means in said second circuit.

References Cited
UNITED STATES PATENTS

| | | | |
|---|---|---|---|
| 2,627,213 | 2/1953 | Hye | 156—251 |
| 2,726,706 | 12/1955 | Hakomaki | 156—251 |
| 3,009,851 | 11/1961 | Madsen | 156—251 |
| 3,015,600 | 1/1962 | Cook | 156—315 |
| 3,234,072 | 2/1966 | Dreeben | 156—515 |
| 3,354,017 | 11/1967 | Lazear et al. | 156—515 |

DOUGLAS J. DRUMMOND, *Primary Examiner.*